(12) United States Patent
Okajima

(10) Patent No.: US 8,223,366 B2
(45) Date of Patent: Jul. 17, 2012

(54) PRINTING SYSTEM INCLUDING FILE STANDARD DETERMINING UNIT

(75) Inventor: Jun Okajima, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1061 days.

(21) Appl. No.: 12/049,919

(22) Filed: Mar. 17, 2008

(65) Prior Publication Data

US 2008/0239375 A1 Oct. 2, 2008

(30) Foreign Application Priority Data

Mar. 28, 2007 (JP) ................................ 2007-085187

(51) Int. Cl.
*G06F 15/00* (2006.01)
(52) U.S. Cl. ........................................ 358/1.15; 358/1.1
(58) Field of Classification Search ................... 358/1.1, 358/1.6, 1.9, 1.15, 401, 501
See application file for complete search history.

(56) References Cited

U.S. PATENT DOCUMENTS

| 2003/0184803 A1 | 10/2003 | Yamada et al. |
| 2004/0057073 A1 | 3/2004 | Egawa et al. |
| 2007/0041040 A1 | 2/2007 | Ozawa |
| 2008/0030780 A1 | 2/2008 | Izawa |
| 2008/0186538 A1 * | 8/2008 | Park .............................. 358/1.15 |

FOREIGN PATENT DOCUMENTS

| CN | 1449181 A | 10/2003 |
| JP | 2000-250797 A | 9/2000 |
| JP | 2002-091716 A | 3/2002 |
| JP | 2004-007517 A | 1/2004 |
| JP | 2004-110740 A | 4/2004 |
| JP | 2004-206302 A | 7/2004 |
| JP | 2004-221772 A | 8/2004 |
| JP | 2005-161556 A | 6/2005 |
| JP | 2006-035448 A | 2/2006 |
| JP | 2006-227908 A | 8/2006 |
| JP | 2006338442 A * | 12/2006 |
| JP | 2007-050649 A | 3/2007 |
| WO | 2006-022271 A1 | 3/2006 |

OTHER PUBLICATIONS

The State Intellectual Property Office of the People's Republic of China; Decision of Rejection for Chinese Patent Application No. 200810087638.8, mailed Sep. 9, 2010.

(Continued)

*Primary Examiner* — Thomas D Lee
(74) *Attorney, Agent, or Firm* — Baker Botts L.L.P.

(57) ABSTRACT

A printing system includes an image file standard determining unit, an additional information determining unit, an printing data creating unit, and a printing unit. The image file standard determining unit is configured to determine whether image data subject to printing is created in conformity with a prescribed image file standard. The additional information determining unit is configured to refer to additional information attached to the image data and determine whether the image data is created in a prescribed image data format based on the additional information. The printing data creating unit creates printing data based on the image data that is in conformity with the prescribed image file standard and the prescribed image data format. The printing unit prints an image based on the printing data created by the printing data creating unit.

16 Claims, 10 Drawing Sheets

OTHER PUBLICATIONS

The State Intellectual Property Office of the People's Republic of China; Office Action in Chinese Patent Application No. 200810087638.8 mailed Oct. 9, 2009.

Japan Patent Office; Office Action in Japanese Patent Application No. 2007-085187 mailed Jul. 21, 2009.

Japanese Patent Office, Office Action for Patent Application No. JP2007-085187, mailed Dec. 24, 2008.

Japan Patent Office, Office Action for Japanese Patent Application No. 2008-027275, mailed Sep. 27, 2011.

\* cited by examiner

FIG.2
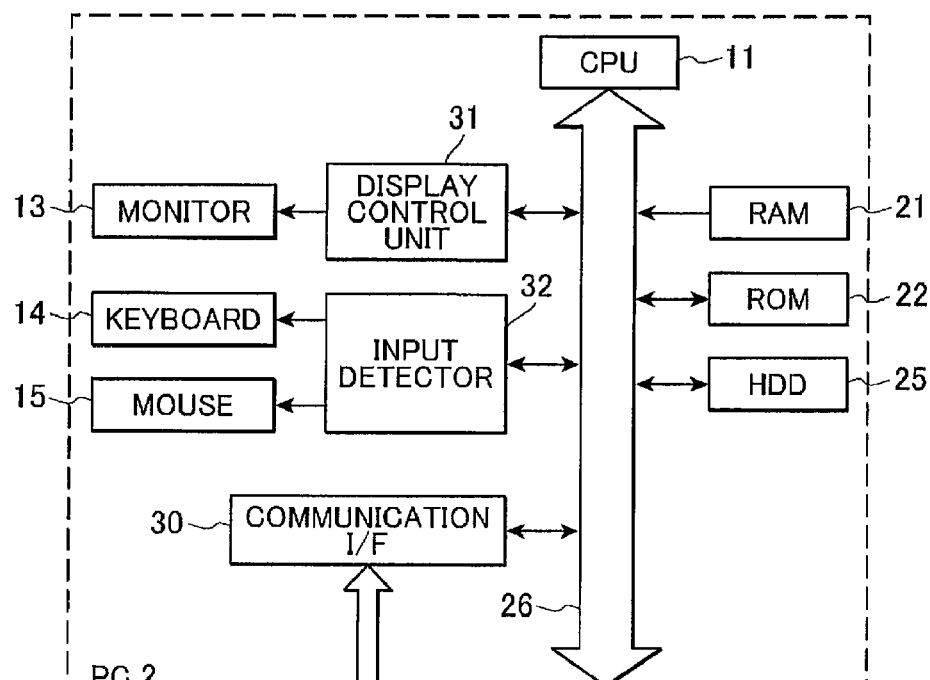
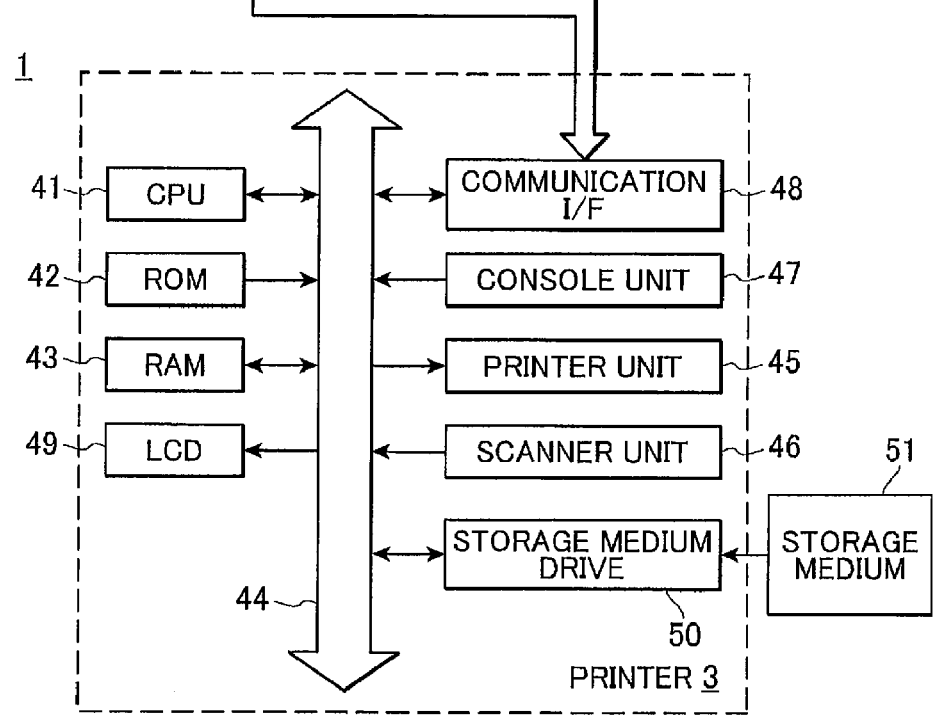

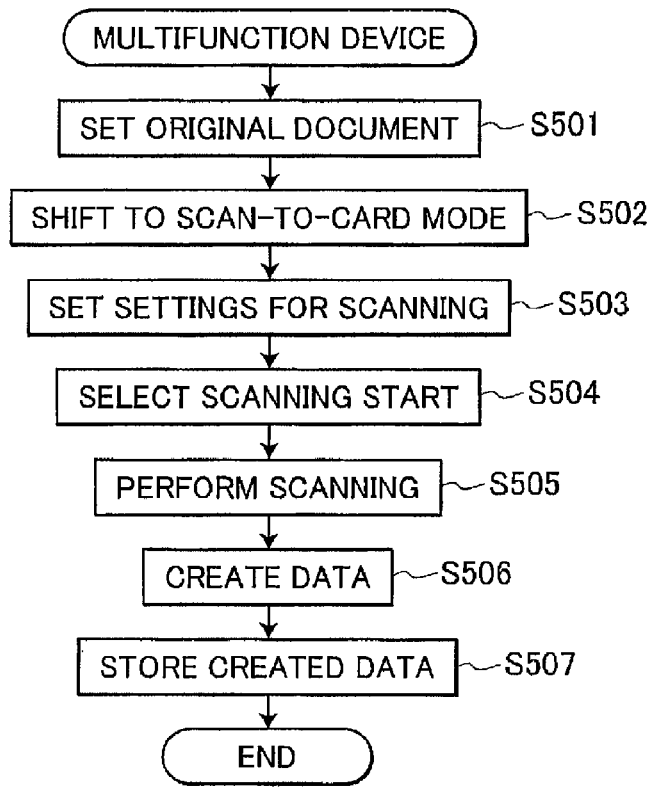
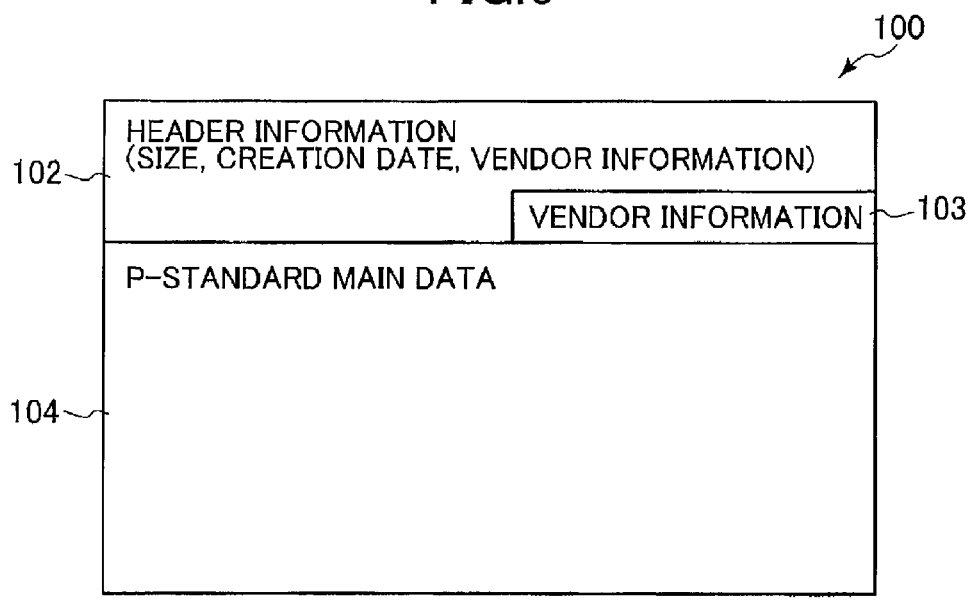

○○○.ppp is being printed.
Reception Date and Time: YY/MM/DD, HH:MM

○○○.ppp has been properly printed.
Print-Completion Date and Time: YY/MM/DD, HH:MM

○○○.ppp is unprintable. File has to be created in conformity with J-standard or manufacturer's format P-standard. Reception Date and Time: YY/MM/DD, HH:MM

PRINTING SYSTEM INCLUDING FILE STANDARD DETERMINING UNIT

CROSS REFERENCE TO RELATED APPLICATION

This application claims priority from Japanese Patent Application No. 2007-085187 filed Mar. 28, 2007. The entire content of this priority application is incorporated herein by reference.

TECHNICAL FIELD

The invention relates to a printing system, and a method for printing.

BACKGROUND

A conventional printer which performs direct printing has been conventionally known. In the direct printing, the printer prints an image based on the image file without executing an application in which the image file is created. In the direct printing, if the image file is created in PDF standard, the image file is converted into PostScript (trademark registered by Adobe system) standard (hereinafter, referred to "PS standard") and the converted image file is printed.

In the color laser printer disclosed in Japanese Patent Application Publication No. 2006-227908 (pages 11-13, FIGS. 4 and 5), if a PDF file can be converted into the PS standard, the printer can perform printing according to the user's request. On the other hand, if a PDF file cannot be converted into PS standard, the printer reports to a server that the file conversion has failed. The server converts the PDF file and then transmits the converted file to the printer for printing.

SUMMARY

When the printer fails the file conversion, such a failure causes an excessive load on the printer.

Particularly in the case where the printer includes a communication facility for communicating with a plurality of external devices, the load due to file conversion failure also has a bad influence on the communication with external devices. Furthermore, in the case where the printer is a multifunction device which has a scanning function and a facsimile function in addition to a printing function, the load due to file conversion failure also has a bad influence on the scanning function and the facsimile function.

It is an object of the invention to provide a printer, a printing system, and a method for printing which prevent the printer from being over loaded during the direct printing.

In order to attain the above and other objects, the invention provides a printing system. The printing system includes an image file standard determining unit, an additional information determining unit, an printing data creating unit, and a printing unit. The image file standard determining unit is configured to determine whether image data subject to printing is created in conformity with a prescribed image file standard. The additional information determining unit is configured to refer to additional information attached to the image data and determine whether the image data is created in a prescribed image data format based on the additional information. The printing data creating unit creates printing data based on the image data that is in conformity with the prescribed image file standard and the prescribed image data format. The printing unit prints an image based on the printing data created by the printing data creating unit.

According to another aspects, the invention provides a method for printing. The method includes determining whether image data subject to printing is created in a prescribed image file standard, referring to additional information attached to the image data, determining whether the image data is created in a prescribed image data format based on the additional information, creating printing data based on the image data that is in conformity with the prescribed image file standard and the prescribed image data format, and printing an image based on the printing data created by the creating.

BRIEF DESCRIPTION OF THE DRAWINGS

Embodiments in accordance with the invention will be described in detail with reference to the following figures wherein:

FIG. 2 is a block diagram showing the printing system of FIG. 1;

FIG. 5 is a flowchart showing a process in which a multifunction device creates a manufacturer's format P-standard file;

FIG. 6 illustrates an example of content in the manufacturer's format P-standard file;

FIG. 11 illustrates an example of content of a file stored in the during-printing file folder;

FIG. 12 illustrates an example of content of a file stored in a printed-file folder;

FIG. 13 illustrates an example of content of a file stored in an unprintable-file folder;

DETAILED DESCRIPTION

Hereinafter, the embodiments of the invention will be described with reference to the accompanying drawings.

Figure 1:
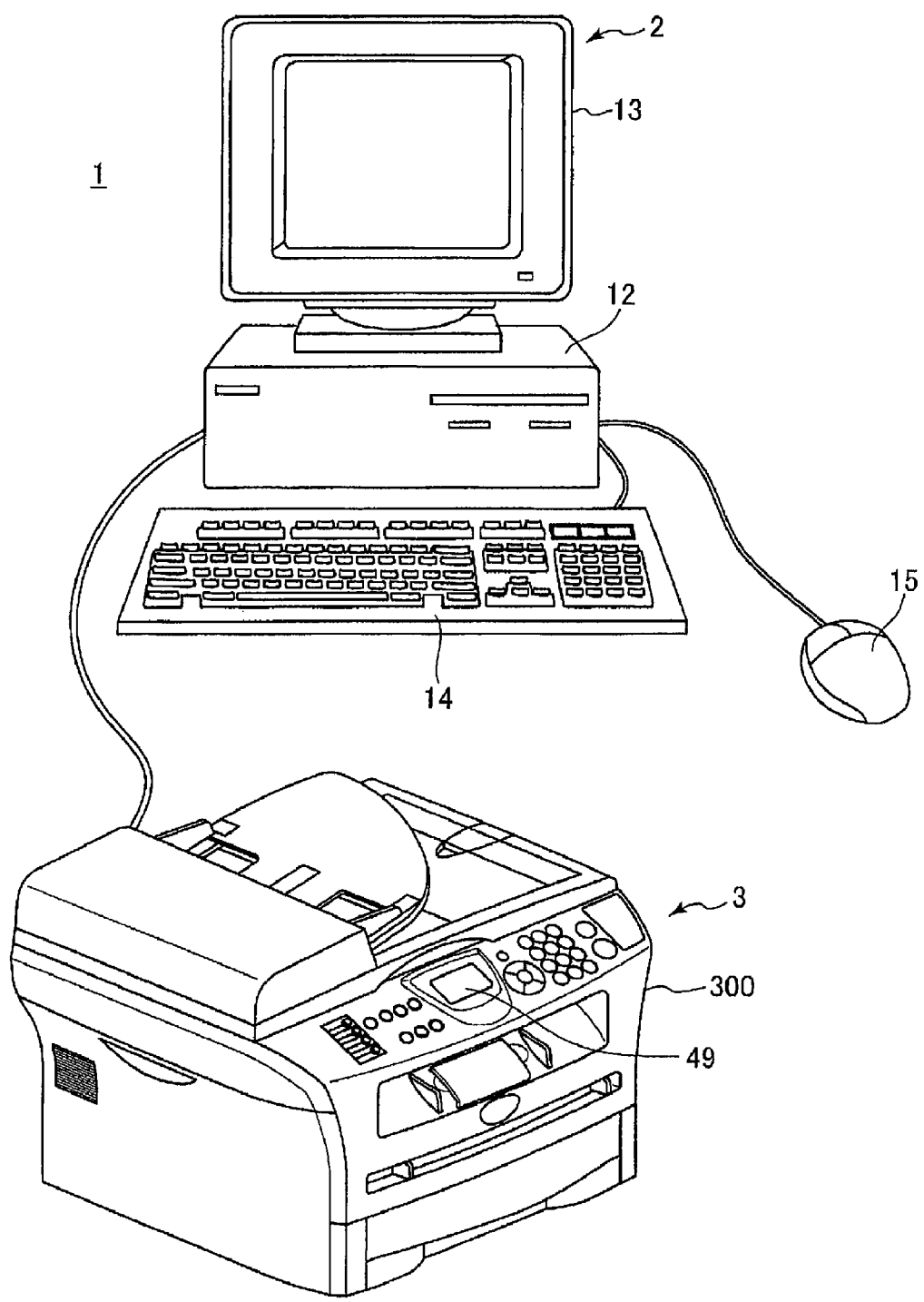
FIG. 1 shows an appearance of a printing system 1 according to embodiments.

FIG. 1 shows an appearance of a printing system 1. The printing system 1 includes a multifunction device 3 of the embodiment and a Personal Computer 2 (hereinafter, referred to "PC 2") as a peripheral device of the PC 2. The PC 2 and the multifunction device 3 are connected to each other, through a LAN cable, a Universal Serial Bus (USB) cable, or the like, so as to achieve bi-directional communication.

In the embodiment, in the multifunction device 3 a direct printing is performed only on a JPEG image file (hereinafter, referred to as "J-standard file"), or on a PDF image file created in the multifunction device 3 (hereinafter, referred to as "manufacturer's format P-standard file"). In the direct printing, the multifunction device 3 prints an image based on the image file without executing an application by which the image file is created.

Accordingly, the direct printing is not performed on a PDF file (PDF-standard file) unless the PDF file is a manufacturer's format P-standard file. Hereinafter, a PDF file (PDF-standard file) is simply referred to as a "P-standard file". For this reason, when the multifunction device 3 creates a manufacturer's format P-standard image file, the multifunction device 3 adds the information that the P-standard file is created in the multifunction device 3, to header information of the created P-standard file. This allows the multifunction device 3 to determine that the PDF file is the manufacturer's format P-standard file.

In the PC 2, an operating system (OS) such as Windows (registered trademark), Linux (registered trademark), or Mac OS (registered trademark), is installed. These operating systems provide various basic functions to be used in various applications in common. For example, the basic functions include input and output function, and function to access to a memory that is a main memory of the device and to a hard disk that is an auxiliary memory of the device. The various functions provided by each of the operating systems have already been known, so their detailed descriptions are omitted here. Hereinafter, in the embodiment the PC 2 has the various functions (API) provided by Windows (registered trademark).

A printer driver is installed on the PC 2 so that the PC 2 controls the multifunction device 3 to print an image. Accordingly, an image file stored in the PC 2, is printed by the multifunction device 3.

On the other hand, the multifunction device 3 includes a casing 300. The multifunction device 3 includes, as a display unit, a liquid crystal display (LCD) 49 having backlighting, on a surface of casing 300. The display screen of the LCD 49 is illuminated by backlight.

FIG. 2 is a block diagram showing the printing system 1 which includes the multifunction device 3 according to the embodiment and the PC 2 connected to the multifunction device 3.

As shown in FIGS. 1 and 2, the PC 2 includes a main unit 12 having a CPU 11, a monitor 13, a keyboard 14, and a mouse 15. The monitor 13, the keyboard 14, and the mouse 15 are connected to the main unit 12 through respective connection cables.

In addition, the CPU 11 is connected to a RAM 21, a ROM 22, and a hard disk drive (HDD) 25 through a bus 26. The RAM 21 is for temporarily storing various results calculated by the CPU 11. The ROM 22 stores programs to be executed by the CPU 11, such as a BIOS. The HDD 25 is used as a data storage unit. The ROM 22 stores programs and the like required for the CPU 11 to perform the processes shown in FIGS. 8-10 to be described later.

Further, the CPU 11 is connected to a communication I/F 30, a display control unit 31, and an input detector 32 through the bus 26. The communication I/F 30 is for communicating with an external device such as the multifunction device 3. The display control unit 31 controls the monitor 13 to display the operation screen for the user. The keyboard 14 and the mouse 15 allow the user to make entries. The input detector 32 is connected to the keyboard 14 and the mouse 15 for detecting the entries made by the user.

As described above, the PC 2 and the multifunction device 3 are connected to each other, through a LAN cable, or a USB cable, such that the PC 2 and the multifunction device 3 communicate bi-directionally with each other. The PC 2 recognizes the multifunction device 3 as a network drive if the multifunction device 2 is connected to the PC 2 by a LAN cable. On the other hand, the PC 2 recognizes the multifunction device 3 as a device having a removal storage area, if the multifunction device 2 is connected to the PC 2 by a USB cable. In any case, the PC 2 can access the directory structure created in the multifunction device 3. In addition, the PC 2 displays icons corresponding to the directory structure created in the multifunction device 3. The user can drag-and-drop a file onto one of the icons that indicates a folder in the multifunction device 3 so that the file is copied and then transmitted to the folder corresponding to the icon. The multifunction device 3, for example, creates the directory structure shown in FIG. 3. In the directory structure of FIG. 3, a folder "oΔx-ooo (G:)" 201 represents the multifunction device 3. A print-requesting file folder 202, a during-printing file folder 203, a printed-file folder 204, and an unprintable-file folder 205 are arranged as lower folders of the folder "oΔx-ooo (G:)" 201.

The print-requesting file folder 202 is a folder onto which image files to be direct-printed by the multifunction device 3 are dragged-and-dropped on the PC 2. The during-printing file folder 203 is a folder to which the multifunction device 3 writes the names of direct-printable image files, which can be printed by the multifunction device 3, in a format that is recognizable by the PC 2 and the user. The printed-file folder 204 is a folder to which the multifunction device 3 writes the names of image files, which has been direct printed by the multifunction device 3, in a format that is recognizable by the PC 2 and the user. The unprintable-file folder 205 is a folder to which the multifunction device 3 writes the names of image files, which cannot be direct-printed, in a format that is recognizable by the PC 2 and the user.

Figure 4:
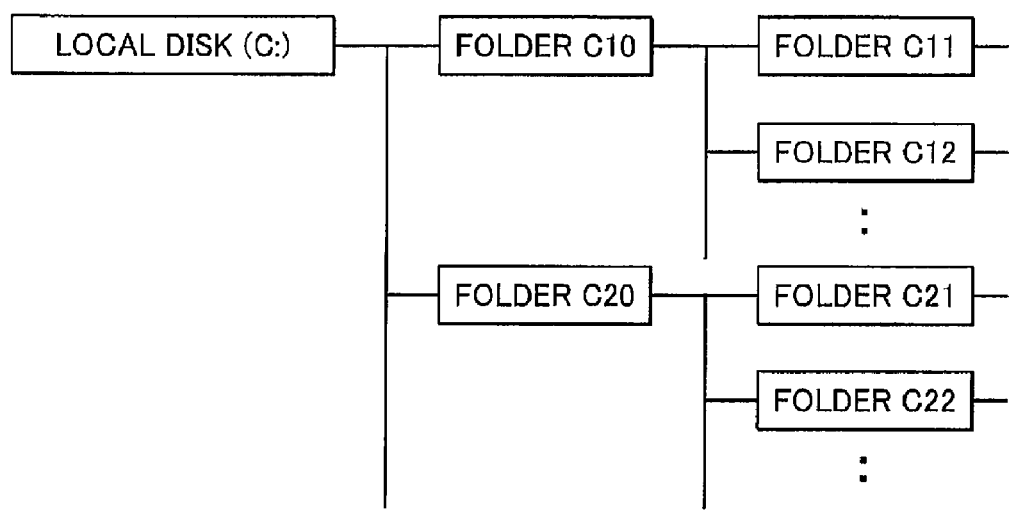
FIG. 4 illustrates another example of a directory structure of the printing system.

As shown in the directory structure of FIG. 4, folders correspond to the print-requesting file folder 202, the during-printing file folder 203, the printed-file folder 204, and the unprintable-file folder 205, may be arranged under a local disk (C:) on the HDD 25 of the PC 2. As shown in FIG. 4, a folder C10 and a folder C20 are arranged as lower folders of the local disk (C:). Folders C11 and C12 are arranged as lower folders of the folder C10. Folders C21 and C22 are arranged as lower folder of the folder C20. For example, the folder C11 corresponds to the print-requesting file folder 202, the folder C12 corresponds to the during-printing file folder 203, the folder C21 corresponds to the printed-file folder 204, and the folder C22 corresponds to the unprintable-file folder 205. The PC 2 may have the function of transmitting the file dragged-and-dropped onto one of the folders stored on the HDD 25, to its corresponding folder stored in the multifunction device 3.

Referring back again to FIG. 2, inside the casing 300, the multifunction device 3 is connected to a CPU 41, a ROM 42, a RAM 43, a printer unit 45, a scanner unit 46, a console unit 47, a communication I/F 48, an LCD 49 as a display unit, a storage medium drive 50, through a bus 44. The ROM 42 stores programs and the like required for the CPU 41 to perform the processes shown in FIGS. 8, 9, and 14, to be described later. The RAM 43 has an area in which data scanned by the scanner unit 46 is stored, processed. The printer unit 45 is provided to perform printing. The scanner unit 46 is provided to perform scanning. Copying is performed through printing and scanning.

The console unit 47 has setting buttons on an operation panel. The console unit 47 is provided to make settings for the direct printing, for example. The communication I/F 48 is provided so that the multifunction device 3 can communicate with an external device such as the PC 2. An external storage medium 51 is detachably mounted to the storage medium drive 50. The storage medium 51 stores image files created in conformity with the manufacturer's format P-standard.

Next, the method of creating a P-standard file as a manufacturer's format P-standard file in the multifunction device 3 is described. FIG. 5 is a flowchart showing a process for the multifunction device 3 to create a manufacturer's format P-standard file.

The CPU 41 of the multifunction device 3 executes the process as shown in the flowchart of FIG. 5. In S501, the CPU 41 detects that the user has set an original document on the scanner unit 46. In S502, the CPU 41 performs mode shifting by receiving an instruction which requests to shift to a scan-to-card mode through the console unit 47. In S503, the CPU 41 sets resolution and a file standard, which are required for scanning. In S504, the CPU 41 accepts input, which is selected by the user, requesting that scanning should be started.

In S505, the CPU 41 controls the scanner unit 46 to performs scanning operation. In S506, the CPU 41 encodes the data obtained in scanning operation of S505, so as to create a manufacturer's format P-standard file.

Figure 7:
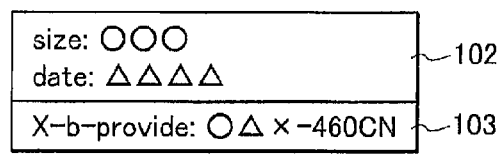
FIG. 7 illustrates an example of content of header information of the manufacturer's format P-standard file.

As shown in FIG. 6, a manufacturer's format P-standard file 100 includes header information 102 in addition to P-standard main data 104. The header information 102 includes size of the manufacturer's format P-standard file 100, and creation date of the manufacturer's format P-standard file 100, and vendor information 103. The vendor information 103 stores vendor-specific information. FIG. 7 illustrates an example showing content of the header information 102. As shown in FIG. 7, the header information 102 stores "size: ooo" indicating the size of the manufacturer's format P-standard file 100; and "date: ΔΔΔΔ" indicating the date when the manufacturer's format P-standard file 100 is created. The vendor information 103 stores "X-b-provide: oΔx-460CN" as the identification number of the multifunction device 3. The identification number indicates that the manufacturer's format P-standard file 100 is created in the multifunction device 3, or equivalently, that the manufacturer's format P-standard file 100 is created in conformity with the manufacturer's format P-standard file.

Referring again to FIG. 5, in S507, the CPU 41 of the multifunction device 3 stores the manufacturer's format P-standard file 100 created in S506, in the external storage medium 51 which has been mounted to the storage medium drive 50. Subsequently, the CPU 41 ends the process.

Figure 8:
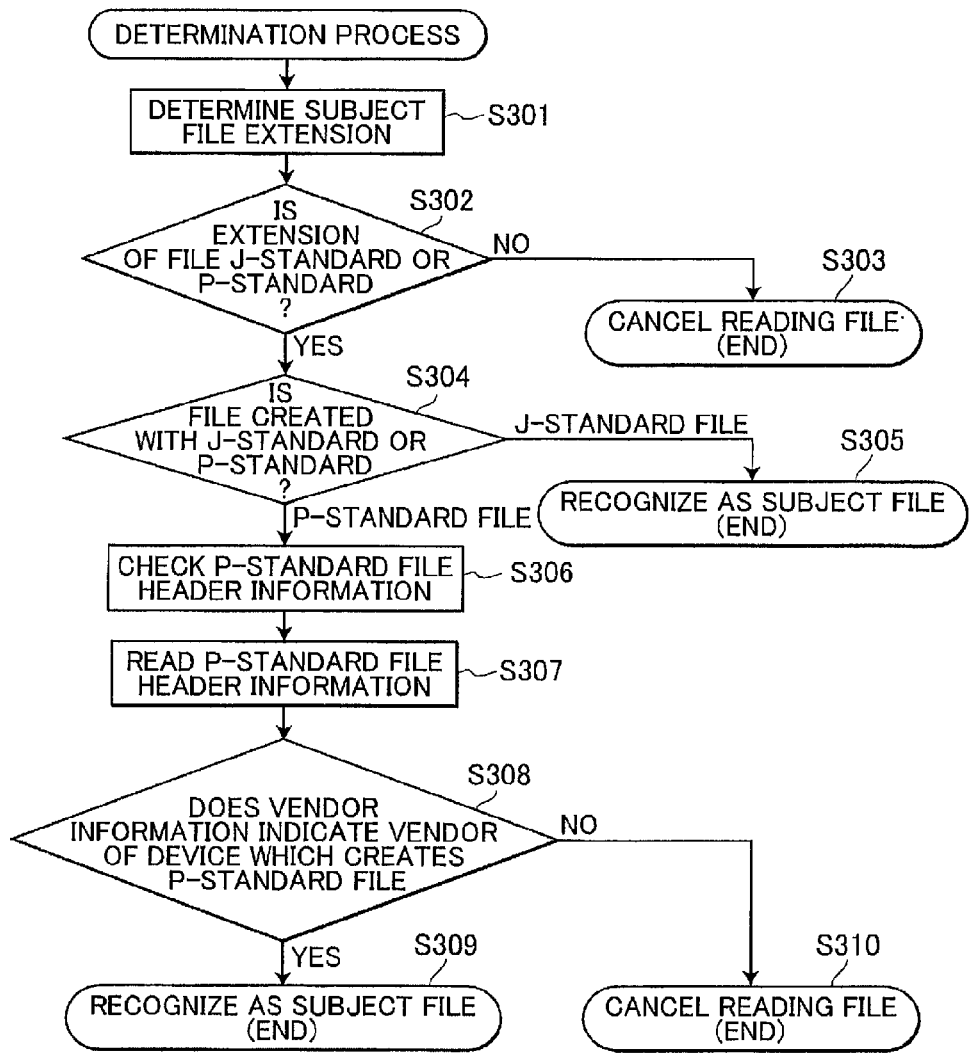
FIG. 8 is a flowchart showing a process performed by a personal computer or a multifunction device to determine whether a file is created in a J-standard or in a manufacturer's format P-standard file according to embodiments.

Next, the method how the PC 2 or the multifunction device 3 determines whether a file is created with the J-standard or with the manufacturer's format P-standard file. FIG. 8 is a flowchart showing a process for the PC 2 or the multifunction device 3 to determine whether a file is created in conformity with the J-standard or the manufacturer's format P-standard file.

The CPU 11 or the CPU 41 executes the process as shown in the flowchart of FIG. 8. That is, each step in FIG. 8 is executed by the CPU 11 or the CPU 41. In S301, the CPU 11 or the CPU 41 determines the extensions of the file subject to printing. In S302, the CPU 11 or the CPU 41 then determines whether or not the file has either one of a J-standard extension and a P-standard extension. In the embodiments, for the convenience of description, the extension of the J-standard file is referred as "jjj", and the extension of the P-standard file is referred as "ppp".

If the file has neither the J-standard extension nor the P-standard extension (S302: No), the CPU 11 or the CPU 41 proceeds to S303. In S303, the CPU 41 cancels reading the file. That is, the CPU 11 or the CPU 41 ends the process.

On the other hand, if the file has either one of the J-standard extension and P-standard extension (S302: Yes), in S304 the CPU 11 or the CPU 41 determines in which standard the file has been created, the J-standard or the P-standard in S304. The CPU 11 or the CPU 41 makes this determination based on the extension of the file.

If in S304 the CPU 11 or the CPU 41 determines that the file has been created as a J-standard file, in S305 the CPU 11 or the CPU 41 recognizes the file as a J-standard file to be direct-printed. Then, the CPU 11 or the CPU 41 ends the process.

On the other hand, if in S304 the CPU 11 or the CPU 41 determines that the file has been created as a P-standard file, in S306 the CPU 11 or the CPU 41 checks the header information of the file that has been created in conformity with P-standard file. In S307, the CPU 11 or the CPU 41 reads the header information of the file that has been created as a P-standard file (see FIG. 6). In S308, the CPU 11 or the CPU 41 determines whether or not the header information of the file that has been created as a P-standard file (see FIG. 6) includes vendor information (see FIG. 6).

If the CPU 11 or the CPU 41 determines that the header information of the file that has been created with the P-standard file (FIG. 6) includes vendor information (FIG. 6), and that the vendor information indicates the vendor (manufacturer) of a device which creates the P-standard file (S308: Yes), that is, the manufacturer of the multifunction device 3, in S309 the CPU 11 or the CPU 41 recognizes the file as a P-standard file to be direct printed. In other words, the vendor information indicates that the file is created as a manufacturer's format P-standard file, the CPU 11 or the CPU 41 recognizes the file that can be direct printed. The CPU 11 or the CPU 41 ends the process.

On the other hand, if the CPU 11 or the CPU 41 determines that the header information of the subject P-standard file includes no vendor information, or that the vendor information does not indicate the printer manufacturer even if the vendor information (FIG. 6) is included (S308: No), in S310 the CPU 11 or the CPU 41 cancels reading the file. The CPU 11 or the CPU 41 ends the process.

Direct Printing According to First Embodiment

Hereinafter, the direct printing of a first embodiment is concretely described with reference to the flowchart shown in FIG. 8. In the direct printing according to the first embodiment, both the PC 2 and the multifunction device 3 participate in the operation for achieving the direct printing. In the first embodiment, the multifunction device 3 direct-prints manufacturer's format P-standard files stored in the PC 2, by using a PC application installed in the PC 2.

Figure 9:
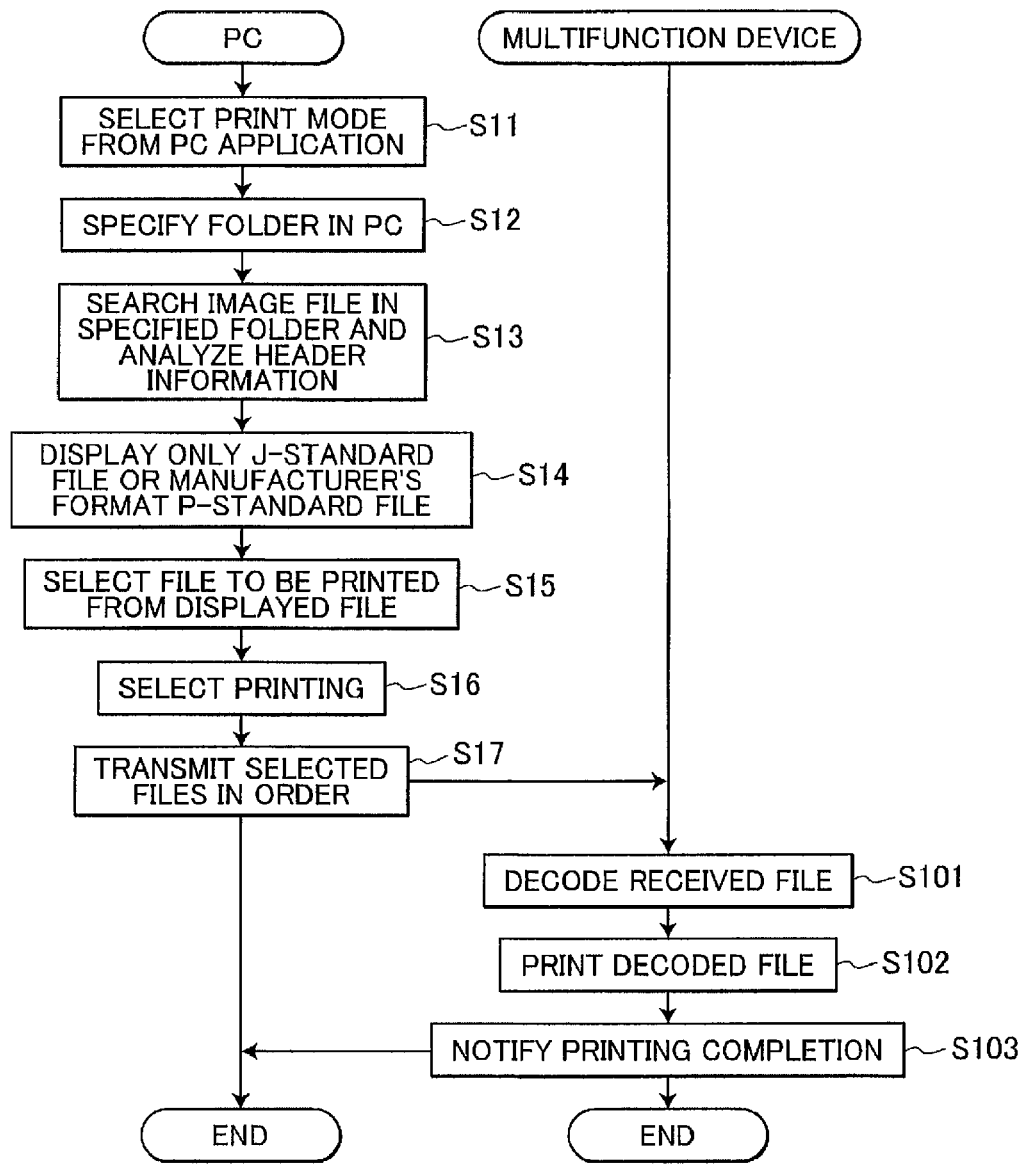
FIG. 9 is a flowchart showing a process according to a first embodiment.

FIG. 9 is a flowchart showing a direct printing process to be executed by the printing system 1 according to the first embodiment.

First, when the CPU 11 of the PC 2 starts the process shown in the flowchart of FIG. 9, in S11 the CPU 11 of the PC 2 shifts to an image-print mode in accordance with the selection of the image-print mode by the user on the PC application. In S12 the CPU 11 specifies one of the folders on the HDD 25 in response to user's specification on the PC application.

In S13, the CPU 11 searches image files in the folder specified in S12, and then analyzes the header information of the image files (P-standard files). In S14, the CPU 11 displays only J-standard files and manufacturer's format P-standard files on the monitor 13, based on the results of the search and the analysis obtained in S13.

In S15, as the user selects files from the files displayed on the monitor 13, the CPU 11 specifies the selected files based on the user's selection. In S16, as the user selects, on the PC application, to start printing, the CPU 11 of the PC 2 starts to perform the direct-printing with respect to the selected files specified in S15.

Specifically, in S17, the CPU 11 transmits sequentially each selected file specified in S15 to the multifunction device 3. On the other hand, on the side of the multifunction device 3, the CPU 41 executes the process shown in the flowchart of FIG. 9, and sequentially receives the selected file transmitted from the PC 2. Specifically, in S101, the CPU 41 of the multifunction device 3 sequentially decodes the received files. That is, the CPU 41 transforms the received file into a file in conformity with a file standard, for example, PostScript (PS) standard (trademark registered by Adobe system) that can be printed by the printing unit 45. In other words, the manufacturer's format P-standard is a standard which can be transformed by the CPU 41 into the format that can be printed by the printing unit 45. In S102, the CPU 41 sequentially prints each received file which has been decoded, by using the printer unit 45. In S103, the CPU 41 of the multifunction device 3 notifies, to the PC 2, that the printing process has been completed.

Direct Printing According to Second Embodiment

Hereinafter, direct printing according to a second embodiment is described. In the direct printing according to the second embodiment, the multifunction device 3 direct-prints manufacturer's format P-standard files stored in the PC 2, without starting any application installed in the PC 2.

Figure 10:
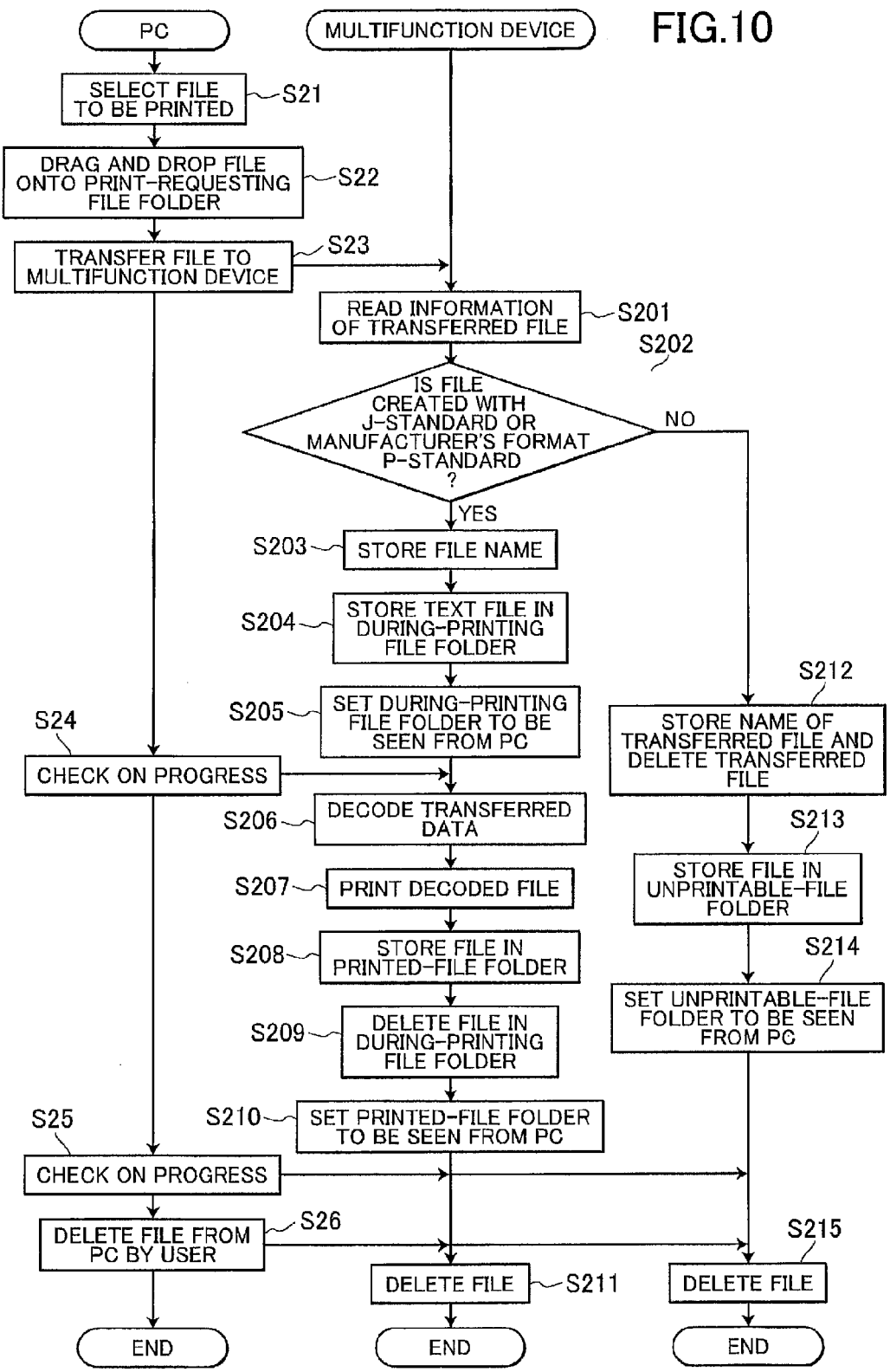
FIG. 10 is a flowchart showing a process according to a second embodiment.

FIG. 10 is a flowchart showing a direct printing process to be executed by the printing system 1 according to the second embodiment.

Figure 3:
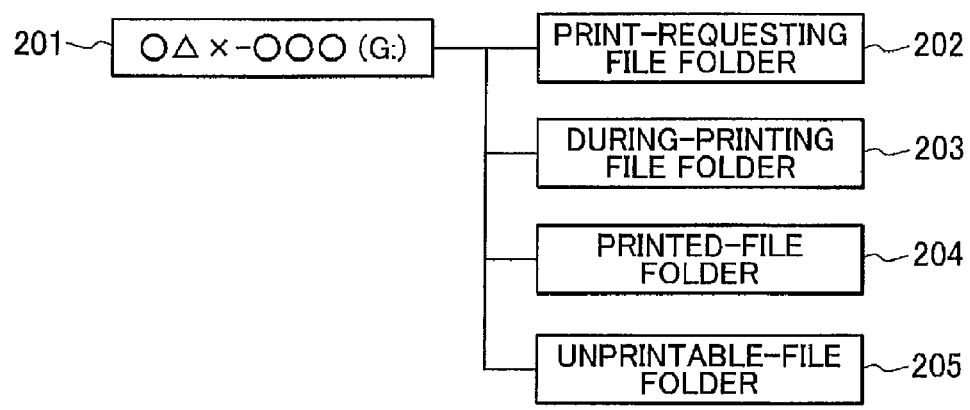
FIG. 3 illustrates an example of a directory structure of a printing system.

The CPU 11 of the PC 2 executes the process shown in the flowchart of FIG. 10. In S21, when the user selects files to be printed, the CPU 11 sets the files selected by the user to a selected state in response to the user's selection. In S22, the user drags-and-drops the selected files onto the print-requesting file folder 202 (FIG. 3). In S23, the CPU 11 transfers each of the select files which have been dragged-and-dropped in S22, sequentially to the multifunction device 3. When the selected files are transferred to the print-requesting file folder 202, the CPU 41 of the multifunction device 3 executes the process shown in the flowchart of FIG. 10. Specifically, in S201, the CPU 41 sequentially reads each of the data in the selected files transferred from the PC 2. In S202, the CPU 41 determines which type of extension each of the selected files has, the J-standard or the P-standard. If the file has the P-standard extension, in S202 the CPU 41 further reads the header information of the file that is determined as a P-standard file, and then determines whether or not the vendor information in the header information of the file includes the identification number representing a manufacturer's format P-standard file.

If the CPU 41 determines that the transferred file has been created with the J-standard or with the manufacturer's format P-standard (S202: YES), the CPU 41 performs S203 and the successive steps on the transferred file that is determined to be the J-standard file or the manufacturer's format P-standard file. Specifically, in S203, the CPU 41 stores the name of the transferred file that is determined to be the J-standard file or the manufacturer's format P-standard file (for example, "ooo.ppp"). In S204, the CPU 41 stores a file name, which is named by adding the name of the file that is stored in S203 to ".txt", in the during-printing folder. In other words, in S204 the CPU 41 creates a text file and stores the text file in the during-printing file folder 203 (FIG. 3), with the name specifying the name of the file stored in S203 (the transferred file). For example, the CPU 41 sets the file name of the text file as "ooo.ppp.txt" which is determined by adding the extension ".txt" to the file name "ooo.ppp" corresponding to the transferred file that is determined to be the J-standard file or the manufacturer's format P-standard file in S203. Subsequently, the CPU 41 stores the file name "ooo.ppp.txt" in the during-printing folder 203.

In the text file ("ooo.ppp.txt") that is to be stored in the during-printing file folder 203, the CPU 41 also stores a content of a text document 111 as shown in FIG. 11. For example, the text document 111 includes texts "ooo.ppp is being printed" and "Reception Date and Time: YY/MM/DD HH:MM". "Reception Date and Time" means the date and time when the data of the selected file transferred from the PC 2 was read by the CPU 41 in S201.

If another text file having the same name "ooo.ppp.txt" has already been stored in the during-printing file folder 203, in S204 the CPU 41 sets a file name "ooo.ppp2.txt" instead of the file name "ooo.ppp.txt", for the current text file, which is named by adding a number and ".txt" to the file name ("ooo.ppp"). This procedure avoids overlap of the file name in the during-printing file folder 203.

In S205, the CPU 41 sets the multifunction device 3 so as to ready for replying the instruction, from the PC2, which requests to send the file names of the text file or the content (text document 111 shown in FIG. 11) of the text file in the during-printing file folder 203. That is, the CPU 41 sets the during-printing file folder 203 to be seen from the PC 2. Thus, if the CPU 41 receives the instruction from the PC 2, the CPU 41 can send the file name of the text file or the content of the text file which are stored in the during-printing file folder 203 as a reply to the instruction. The CPU 11 of the PC 2 displays the replied data to the user. In other words, the user can view the file names of the text files or the contents of the text files stored in the during-printing file folder 203 based on the replied data from the multifunction device 3. Accordingly in S24, the user can check on the progress of the direct printing from the PC 2

In S206, the CPU 41 decodes the transferred file according to the standard of the transferred file. That is, the CPU 41 transforms the received file into a file in conformity with a standard (for example, PS standard) that can be printed by the printing unit 45. In S207, the CPU 41 prints image based on the decoded file by using the printer unit 45.

In S208, the CPU 41 stores a file name ("ooo.ppp.txt"), which is named by adding the name of the file that is stored in S203 to ".txt", in the printed-file folder 204. In other words, in S208 the CPU 41 creates a text file and stores the text file in the printed-file folder 204, with the name specifying the name of the file printed in S207 (the transferred file). For example, the CPU 41 sets the file name of the text file as "ooo.ppp.txt" which is determined by adding the extension ".txt" to the file name "ooo.ppp" corresponding to the file that is printed in S207. Subsequently, the CPU 41 stores the file name "ooo.ppp.txt" in the printed-file folder 204.

In the text file "ooo.ppp.txt" that is to be stored in the printed-file folder 204, the CPU 41 also stores the content of a text document 112 as shown in FIG. 12. For example, the text document 112 includes texts "ooo.ppp has been properly printed" and "Print-Completion Date and Time: YY/MM/DD HH:MM". "Print-Completion Date and Time" means the date and time when the printing was performed in S207.

If another file having the same name "ooo.ppp.txt" has already been stored in the printed-file folder 204, in S208 the CPU 41 sets a file name "ooo.ppp2.txt" instead of the file name "ooo.ppp.txt", for the current text file, which is named by adding a number (for example, "2") and ".text" to the file name "ooo.ppp". This procedure avoids overlap of the file name in the printed-file folder 204.

In S209, the CPU 41 deletes the file name ("ooo.ppp.txt") (or the text file), that is named by adding the extension ".txt" to the file name ("ooo.ppp"), in the during-printing file folder 203 in 204.

In S210, the CPU 41 sets up the multifunction device 3 so that the user can view the content (files) of the printed-file folder 204 from the PC 2. In other words, in S210, the CPU 41 sets the multifunction device 3 so as to ready for replying the instruction, from the PC2, which requests to send the file name of the text file or the content (text document 112 shown in FIG. 12) of the text file in the printed-file folder 204 (FIG. 3) from the PC 2. Thus, if the CPU 41 receives the instruction from the PC 2, the CPU 41 can send the file name of the text file or the content of the text file which are stored in the printed-file folder 204 as a reply to the instruction. The CPU 11 of the PC 2 displays the replied data (the file name of the text file or the content of the text file which are stored in the printed-file folder 204) to the user. In other words, the user can view the file name of the text file or the content of the text file which are stored in the printed-file folder 204. Accordingly in S25, the user can check on the progress of the direct printing from the PC 2. From the PC 2, in S26 the user can delete the file name of the text file (the text file) stored in the printed-file folder 204 in S208.

Even if the user does not perform any operation for file deletion, in S211, when the access to the PC 2 is disconnected, the CPU 41 of the multifunction device 3 deletes the file name (the text file) stored in the printed-file folder 204 in S208. This procedure prevents the number of unidentified files from increasing.

On the other hand, in S202, if the CPU 41 determines that the transferred file has been created neither with the J-standard nor with the manufacturer's format P-standard (S202: NO), the CPU 41 performs S212 and the successive steps on the transferred file. Specifically, in S212, the CPU 41 stores the name of the transferred file, and deletes the transferred file. In S213, the CPU 41 stores a file name ("ooo.ppp.txt"), which is named by adding the name of the transferred file ("ooo.ppp") stored in S212 to ".txt", in the unprintable-file folder 205.

In the file "ooo.ppp.txt" that is to be stored in the unprintable-file folder 205, the CPU 41 also stores the content of a text document 113 shown in FIG. 13. For example, the text document 113 includes texts "ooo.ppp is unprintable; File has to be created in conformity with J-standard or manufacturer's format P-standard" and "Reception Date and Time: YY/MM/DD HH:MM". Reception Date and Time" indicates the date and the time when the CPU 41 read the data of the selected file transferred from the PC 2 in S201. That is the test document 113 is configured to notify, to the user, that the multifunction device 3 is incapable of decoding the selected file, thus the multifunction device 3 is incapable of direct-printing the image based on the selected file.

If another file having the same name "ooo.ppp.txt" has already been stored in the unprintable-file folder 205, in S213 the CPU 41 sets a file name "ooo.ppp2.txt" instead of the file name "ooo.ppp.txt", for the current text file, which is named by adding a number and ".text" to the file name "ooo.ppp". This procedure avoids overlap of the file name in the printed file folder.

In S214, the CPU 41 sets up the multifunction device 3 so that the user can view the contents (the text document 113 in FIG. 13) of the unprintable-file folder 205 (FIG. 3) from the PC 2. In other words, in S214, the CPU 41 sets the multifunction device 3 so as to ready for replying the instruction, from the PC2, which requests to send the file names of the text file or the content (the text document 113 shown in FIG. 13) of the text file in the unprintable-file folder 205 from the PC 2. Thus, if the CPU 41 receives the instruction from the PC 2, the CPU 41 can send file name of the text file or the content of the text file in the unprintable-file folder 205 as a reply to the instruction. The CPU 11 of the PC 2 displays the replied data (the file name of the text file or the content of the text file which are stored in the unprintable-file folder 205) to the user. In other words, the user can view the file name of the text file or the content of the text file which are stored in the unprintable-file folder 205. Accordingly, in S25, the user can check on the progress of direct printing from the PC 2. In S26 the user can also delete the file name (the text file) from the PC 2, which is stored in the unprintable-file folder 205 in S213. Even if the user does not perform any operation for file deletion, in S215, when the access to the PC 2 is disconnected, the CPU 41 of the multifunction device 3 deletes the file name (the text file) stored in the unprintable-file folder 205 in 213. This procedure prevents the number of unidentified files from increasing.

Direct Printing According to Third Embodiment

Hereinafter, the direct printing according to a third embodiment is described. In the direct printing according to the third embodiment, the multifunction device 3 direct-prints manufacturer's format P-standard files stored in the external storage medium 51.

Figure 14:
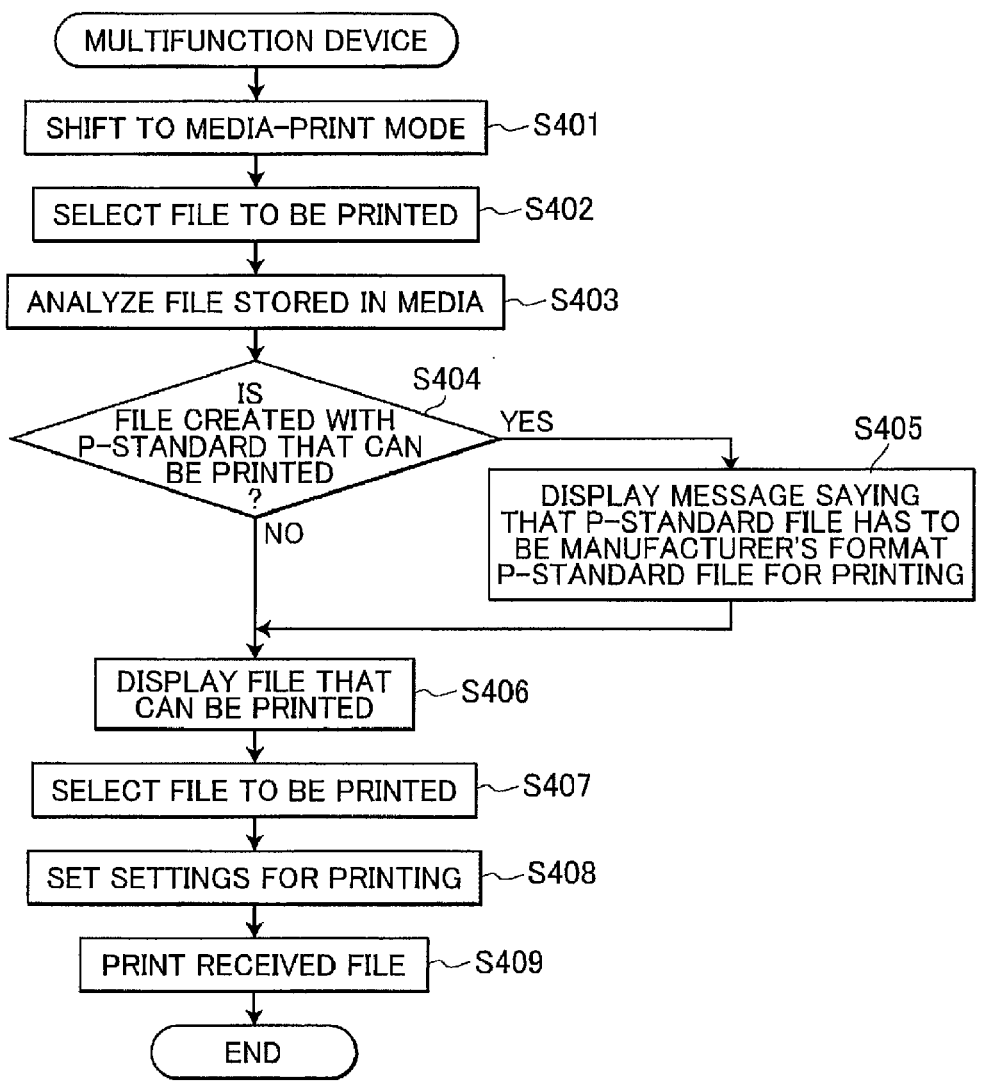
FIG. 14 is a flowchart showing a process according to a third embodiment.

FIG. 14 is a flowchart showing a direct printing process to be executed by the multifunction device 3 according to the third embodiment.

As the CPU 41 of the multifunction device 3 starts the process shown in the flowchart of FIG. 14, in S401, the multifunction device 3 shifts to a media-print mode. In S401, the CPU 41 of the multifunction device 3 also loads image files stored in the storage medium 51 which has been mounted to the storage medium drive 50, and then displays the loaded image files on the LCD 49. In S402, when the user selects files to be printed from the image files displayed on the LCD 49, the CPU 41 specifies the image files in response to this user's selection.

In S403, the CPU 41 analyzes the extension or the header information of each image file stored in the storage medium 51 which has been in the storage medium drive 50. In S404, the CPU 41 determines whether or not any non-direct printing supporting P-standard file (the P-standard file other than the manufacturer's format P-standard file) is included in the image files stored in the storage medium 51 which has been mounted to the storage medium drive 50. In this embodiment, the non-direct printing supporting P-standard file means a non-manufacturer's format P-standard file.

If the CPU 41 determines that any non-direct printing supporting P-standard file is included in the selected image files (S404: YES), in S405, the CPU 41 displays the message on the LCD 49, indicating that a P-standard file has to be created with the manufacturer's format P-standard for printing. That is, the CPU 41 notifies, to the user, that only the manufacturer's format P-standard file can be printed among the 2-standard files.

Figure 15:
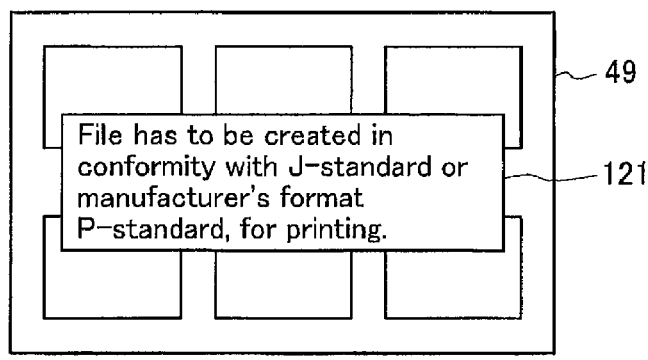
FIG. 15 shows an example of a screen of an LCD which displays a message meaning that only the manufacturer's format P-standard file can be printed.

For example, as shown in FIG. 15, the LCD 49 displays a window 121 for a certain period of time as a pop-up message indicating, "File has to be created in conformity with J-standard or with manufacturer's format P-standard, for printing".

After S405, the CPU 41 proceeds to S406. On the other hand, if the CPU 41 determines that all of the selected P-standard image files have been created with direct printing supporting P-standard, that is, the manufacturer's format P-standard (S404: NO), the CPU 4 proceeds to S406 without showing any message.

In S406, the CPU 41 displays only direct printing supporting P-standard files (manufacturer's format P-standard files) on the LCD 49 out of the image files selected by the user.

Figure 16A:
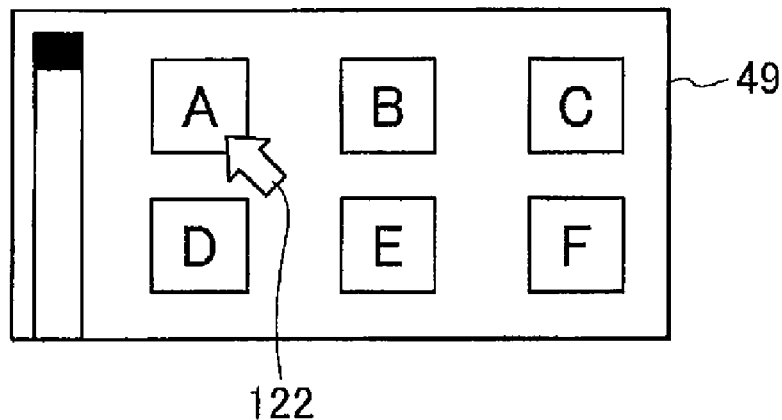
FIG. 16(A) shows a screen of the LCD which displays thumbnails of the manufacturer's format P-standard files.
Figure 16B:
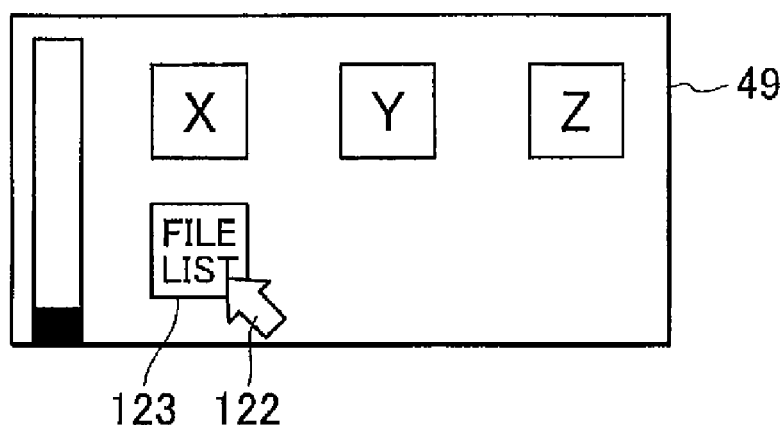
FIG. 16(B) shows a screen of the LCD which displays thumbnails of the manufacturer's format P-standard files and a file-list folder.

In FIGS. 16(A) and 16(B), the thumbnails are shown as framed capital letters. For example, as shown in FIG. 16(A), the LCD 49 displays the thumbnails of the direct printing supporting P-standard files (manufacturer's format P-standard files).

Figure 16C:
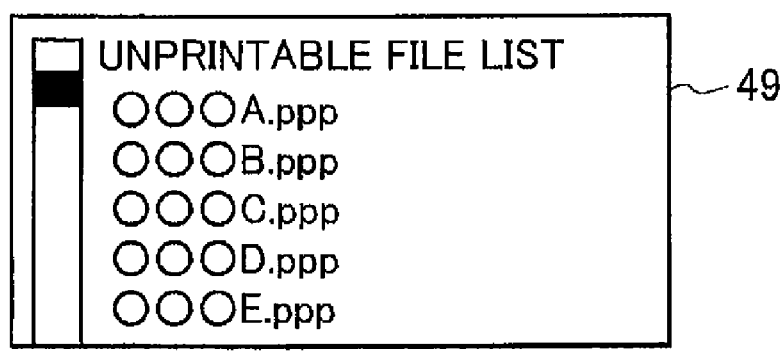
FIG. 16(C) shows a screen of the LCD which displays a P-standard files that cannot be direct-printed by the multifunction device.

For example, as shown in FIG. 16(B), the LCD 49 may display a file-list folder 123. As shown in FIG. 16(c), the file-list folder 123 is opened when the user clicks the file-list folder by a pointer 122.

In S407, when the user selects files to be printed from the image files displayed on the LCD 49, the CPU 41 specifies the image files in response to this user's selection. In S408, the CPU 41 sets a sheet size and resolution that is required when printing the files selected in S407. In S409, the CPU 41 performs printing by using the printer unit 45, based on the data received from the storage medium 51 which is in the storage medium drive 50. Here, before the printing, the CPU 41 decodes the received file, that is, the CPU 41 transforms the received file into a file in conformity with a standard (for example, PS standard) that can be printed by the printing unit 45.

In S406, the CPU 41 displays only the direct printing supporting P-standard files. However, the CPU 41 may display the J-standard files as well as the direct printing supporting P-standard files. Thus, in FIG. 16(A), 16(B), the CPU 41 may display thumbnails corresponding to the J-standard files as well as the direct printing supporting P-standard files.

As described above in detail, in the embodiments, the multifunction device 3 decodes image files created either in the J-standard or the manufacturer's format P-standard file (S101, S206, S408), and then forms images for printing (S102, S409). The PC 2 or multifunction device 3 first determines whether or not each image file has been created with either one of the J-standard or the P-standard, based on the extension of each image file (S13, S202, S302, S404). If any P-standard image file is found, the PC 2 or the multifunction device 3 further determine, based on the header information 102 of the image file, whether the found P-standard image file is created with the P-standard file in which the CPU 41 can transform the image file into a file in conformity with a file standard that can be printed by the printing unit 45 (S13, S202, S308, and S404). On the other hand, the multifunction device 3 does not decode any image file created with a file standard, other than J-standard and other than the P-standard, which cannot be decoded (printed) by the multifunction device 3 (S303, S310). Thus, the multifunction device 3 reduces a load in the direct printing.

In the embodiment, as shown in FIG. 16(A), the multifunction device 3 displays image files, which is J-standard files or manufacturer's format P-standard files, on the LCD 49. As shown in FIG. 16(C), the multifunction device 3 also displays image files, which is other than the J-standard files and other than the manufacturer's format P-standard files, in a method that is different from a method in which the multifunction device 3 displays the image files which are the J-standard files or the manufacturer's format P-standard files. That is, the multifunction device 3 displays the image files in a method distinguishing the image files created as a J-standard file or a manufacturer's format P-standard file which can be printed by the multifunction device 3, and the image files other than the J-standard file and other than the manufacturer's format P-standard file which cannot be printed by the multifunction device 3 (S406). Since the multifunction device 3 displays image file in the different methods depending on whether the image file can be decoded (printed) by the multifunction device 3. Thus, the multifunction device can notify the user if the file can be direct-printed by the multifunction device 3.

In the embodiment, if the multifunction device 3 determines that the P-standard image file cannot be recorded (or, decoded) by the multifunction device 3 (S404: YES), the multifunction device 3 displays the message on the LCD 49, meaning that only the manufacturer's format P-standard file can be printed among the P-standard files (S405, FIG. 15). The multifunction device 3 can inform the user of the image file that cannot be printed by the multifunction device 3.

In the embodiments, the multifunction device 3 creates a P-standard image file from the data obtained by scanning an original document by the scanner unit 46 (S502-S506). The vendor information 103 indicating that the image file is a manufacturer's format P-standard file, which can be recorded (or, decoded) by the multifunction device 3, is added to the header information 102 of the image file (S506, S507, FIG. 6). Even when another multifunction device which is the same type of the multifunction device 3 is employed for direct-printing an image file created by the multifunction device 3, the user can recognize whether the image file can be recorded (decoded). Or, Even when an image file created by the multifunction device 3 is once stored in the storage medium 51, and the multifunction device 3 obtains the image file from the storage medium 51 for the direct printing, the user can recognize whether the image file can be recorded by the multifunction device 3. Accordingly, a load of the multifunction device 3 is reduced before it happens.

In the embodiments, the multifunction device 3 determines whether the image file, which is stored in the storage medium 51 installed in the storage medium drive 50 or which is dragged-and-dropped to the print-requesting file folder 202 that the PC 2 recognizes via the communication I/F 48, is created as the J-standard file or the P-standard file (S13, S202, S302, S404). Further, if the file is determined as a P-standard file, the multifunction device 3 determines whether the file is generated as a P-standard file (a manufacturer's format P-standard file) that can be recorded (decoded) by the multifunction device 3 based on the header information 102 (S13, S202, S308, S404).

The multifunction device 3 instructs the printer unit 45 to direct-print the image file which is determined to be a J-standard file or a manufacturer's format P-standard file that can be decoded and printed by the multifunction device 3 (S102, S207, S409). That is, the multifunction device 3 does not decodes a image file which cannot be recorded (decoded or printed) by the multifunction device 3 among the files stored in the storage medium 51 installed in the storage medium drive 50 or the image files dragged-and-dropped in the print-requesting file folder 202 which is recognized by the pc via the communication I/F 48 (S14-S15, S212, S303 and S310, S406-S407). Accordingly, a process load of the multifunction device 3 during the direct printing can be reduced.

In the embodiments, the multifunction device 3 stores the names of the image files which are other than the J-standard and other than the manufacturer's format P-standard file, in the unprintable-file folder 205 (FIG. 3) that can be recognized by the PC 2 via the communication I/F 48 (S213). The PC 2 is set to be capable of showing the contents of the unprintable-file folder 205 by communicating with the multifunction device 3 via the communication I/F 48. In other words, the user can view the contents of the unprintable-file folder 205 from the PC 2 which is communicating with the multifunction device 3 through the communication I/F 48 (S214). Accordingly, the PC 2 informs the user of the image files that cannot be recorded by the multifunction device 3 (S25).

In the embodiment, when the access to the PC 2 through the communication I/F 48 is disconnected (S215), the multifunction device 3 deletes the file names (the files) which are stored in the unprintable-file folder 205 recognizable to the PC 2 by communicating with the multifunction device 3 through the communication I/F 48. This procedure prevents the files checked by the user, from being left in the unprintable-file folder 205.

In the embodiment, the multifunction device 3 stores the names of the image files created with the J-standard or the manufacturer's format P-standard in the during-printing file folder 203. The multifunction device 3 also stores information indicating a status of the printing operation, for example, the message "ooo.ppp is being printed" and "Reception Date and Time: YY/MM/DD HH:MM" of the text document 111 as shown in FIG. 11 (S204). The during-printing folder can be seen from the PC 2 (S205). The PC 2 can inform the user of the files which can be recorded by the multifunction device 3 (S24).

In the embodiment, the multifunction device 3 deletes the file names (the files) which are stored in the during-printing file folder 203 (S211). This procedure prevents the files checked by the user from being left in the during-printing file folder 203.

While the invention has been described in detail with reference to the above embodiments thereof, it would be apparent to those skilled in the art that various changes and modifications may be made therein without departing from the spirit of the invention.

For example, in FIGS. 16(A), 16(B), and 16(C), shown in the third embodiment, the multifunction device 3 displays image files in the different methods depending on whether or not the image files can be direct-printed. The multifunction device 3 may display the files by adding icons so that an icon that corresponds to the image file (the J-standard file or the manufacturer's format P-standard file) that can be direct-printed by the multifunction device 3 is different form an icon that corresponds to the image file (the image file other than the J-standard file and other than the manufacturer's format P-standard file) that cannot be direct printed by the multifunction device 3. The multifunction device 3 may also display only the files that can be direct-printed by the multifunction device 3.

In FIG. 16(C) shown in the third embodiment, the multifunction device 3 displays the names of the files that cannot be direct-printed. However, the multifunction device 3 may display the file itself (image of the file) that cannot be direct-printed.

In the first embodiment, the PC 2 may include the function (steps) of the multifunction device 3 in the second embodiment so that the user can know the progress of the printing. That is, the PC 2 informs the user the status of the process. More specifically, the CPU 11 performs S204 and S213 after S13. Further, after S17, the CPU 11 performs S208 and S209 every time the CPU receives the notification in S103.

The three direct printing processes (as shown in FIGS. 9, 10, and 14) are described as different embodiments (the first, second, and third embodiments). However, the printing system 1 may switches the three direct printing processes according to the printing conditions. For example, when the user instructs the direct printing by the PC application on PC 2, the printing system 1 performs the direct printing of the first embodiment as shown in FIG. 9. That is, the printing process is performed by the PC 2 and the multifunction device 3 collaborating with one another. When the user instruction the direct printing on PC 2 without using the PC application, the printing system 1 performs the direct printing of the second embodiment as shown in FIG. 10. When the storage medium 51 is mounted to the storage medium driver 50, and when the user instructs to perform the direct printing on the multifunction device 3, the multifunction device 3 performs the direct printing as shown in FIG. 14.

Further, the direct printing may be modified from the embodiments described above. For example, the steps performed by the PC 2 in the embodiments shown in FIGS. 9, 10, and 14 may be performed by the multifunction 3. The steps performed by the multifunction device 3 in the direct printing according to the embodiments shown in FIGS. 9, 10, and 14 may be performed by the PC 2.

The printing system 1 may include another device in addition to the PC 2 and the multifunction device 3. Some steps in the direct printing according to the embodiments as shown in FIGS. 9, 10, and 14 may be performed by this another device. In other words, devices that perform the direct printing collaborating with one another construct the printing system.

In the above embodiment, the extension of the image file is used to determine whether the image file is the image standard (J-standard or P-standard). However, the method to determine whether the image file is the image standard is not limited thereto. The image file may include data that shows the file standard of the image file. For example, the part of the file name of the image file may have the standard name. Thus, the standard of the image file is determined by the file name.

In the above embodiments, the header information that is attached to the image data is used to determine whether the image file (P-standard file) can be direct printed by the multifunction device. However, the method of the determination may be performed based on attached information other than the header information. For example, the method of the determination is performed by footer information attached to the image data.

Further, the embodiments described above, the CPU 11 or CPU 41 determines whether the image file is created by the manufacturer, that is, the image file is created with the manufacturer's format P-standard. However, the determination is not limited thereto. For example, a plurality of companies standardizes an image data format to distinguish from other company's image data format. In other words, the image file is distinguished from image files that is the same standard of the image file but have different data format from the image file. For example, the multifunction device determines the image data format standardized by the plurality of companies based on header information of a subject file from other image data format.

In the embodiments, the image file in the P-standard is transformed into a file in conformity with the PS standard file. However, both of the file standards are not limited thereto. For example, the P-standard file is transformed into a bitmap file, a jpeg file, or a file in which having pixel data where each pixel is given by binary or by multiple values.

In the embodiments, when the CPU 11 or the CPU 41 determines that the image file cannot be printed by the multifunction device 3, the image file is not transformed into image data (for example, the PS standard file) that can be printed by the printing unit 45. That is, when the CPU 11 or the CPU 41 determines that the image file cannot be printed by the multifunction device 3, the printing file (for example, the PS standard file) 45 is not created. However, when the CPU 11 or the CPU 41 determines that the image file cannot be printed by the multifunction device 3, the image may be created under some restriction, or other process may be performed to the image file. For example, when the user instructs to force to print the image regardless of the determination, the multifunction device 3 creates (or tries to create) image data that can be printed by the printing unit 45 with respect to the image file, and the multifunction device 3 performs (or tries to perform) printing the image. Accordingly, when the success of the printing has the possibilities, the multifunction device 3 can meet the user's expectation.

In the above embodiments, the print-requesting file folder 202, the during-printing file folder 203, the printed-file folder 204, and the unprintable-file folder 205 are arranged under the folder "o∆x-ooo (G:)" 201. However, only part of the during-printing file folder 203, the printed-file folder 204, and the unprintable-file folder 205 may be included under the folder "o∆x-ooo (G:).

What is claimed is:

1. A printing system comprising:
    an image file standard determining unit that is configured to determine whether image data subject to printing is created in conformity with a prescribed image file standard;
    an additional information determining unit that is configured to refer to additional information attached to the image data and determine whether the image data is created in a prescribed image data format based on the additional information;
    an printing data creating unit that creates printing data based on the image data that is in conformity with the prescribed image file standard and the prescribed image data format;
    a printing unit that prints an image based on the printing data created by the printing data creating unit;
    an interface that is connectable to an external storage medium that stores the image data; and
    an instruction unit that is configured to instruct the printing unit to print the image,
    wherein the image file standard determining unit performs determination with respect to the image data stored in the external storage medium connected to the interface,
    wherein when the external storage medium is connected to the interface, and when the image file standard determining unit determines that the image data is created in conformity with the prescribed image file standard, the additional information determining unit performs determination with respect to the image data stored in the external storage medium,
    wherein when the additional information determining unit determines that the image data is created in the prescribed image data format, the instruction unit instructs the printing unit to print the image based on the image data.

2. The printing system as claimed in claim 1, wherein the image file standard determining unit determines that the image data is created in the prescribed image file standard based on a filename extension of the image data.

3. The printing system as claimed in claim 1, further comprising a stopping unit that is configured to instruct the printing data creating unit to stop creating the image data when the additional information determining unit determines that the image data is created in an image format other than the prescribed image data format.

4. The printing system as claimed in claim 1, further comprising:
    a display unit; and
    a display control unit that controls the display unit to display an image in a first style corresponding to the image data available when the additional information determining unit determines that the image data is created in the prescribed image data format, and to display an image in a second style different from the first style corresponding to the image data available when the additional information determining unit determines that the image data is created in an image data format other than the prescribed image data format.

5. The printing system as claimed in claim 1, further comprising a notifying unit that is configured to notify that the printing data creating unit is incapable of creating the printing data based on the image data when the additional information determining unit determines, based on the additional information, that the image data is created in an image data format other than the prescribed image data format.

6. The printing system as claimed in claim 1, further comprising:
    a scanner that scans a document;
    an image data creating unit that is configured to create the image data corresponding to the document scanned by the scanner; and
    an adding unit that is configured to add to the image data the additional information indicating that the printing data creating unit is capable of creating the printing data based on the image data.

7. The printing system as claimed in claim 1, wherein the additional information includes header information.

8. The printing system as claimed in claim 1, the printing system further comprising a casing that accommodates the image file standard determining unit, the additional information determining unit, the printing data creating unit, and the printing unit.

9. A printing system comprising:
    an image file standard determining unit that is configured to determine whether image data subject to printing is created in conformity with a prescribed image file standard;
    an additional information determining unit that is configured to refer to additional information attached to the image data and determine whether the image data is created in a prescribed image data format based on the additional information;
    an printing data creating unit that creates printing data based on the image data that is in conformity with the prescribed image file standard and the prescribed image data format;
    a printing unit that prints an image based on the printing data created by the printing data creating unit;
    a computer; and
    a first storing unit,
    wherein the image file standard determining unit, the additional information determining unit, the printing data creating unit, and the printing unit configure a printing device,
    wherein the first storing unit is accessible by the computer and the printing device, wherein when the computer stores the image data in the first storing unit, the image file standard determining unit performs determination with respect to the image data stored in the first storing unit by the computer;

wherein when the image file standard determining unit determines that the image data is created in conformity with the prescribed image file standard, the additional information determining unit performs determination with respect to the image data.

10. The printing system as claimed in claim 9, further comprising a second storing unit that is accessible by the computer and the printing device; and a storage control unit that stores, in the second storing unit, a name indicative of the image data that is determined by the additional information determining unit as being image data created in a data format other than the prescribed image data format.

11. The printing system as claimed in claim 10, wherein the printing device further includes a deletion control unit that is configured to delete the name of the image stored in the second storing unit.

12. The printing system as claimed in claim 9, wherein the printing device further includes:

a second storing unit that is accessible by the computer and the printing device; and a storage control unit that stores in the second storing unit a name indicative of the image data that is currently printed.

13. The printing system as claimed in claim 9, wherein the printing device further includes:

a second storing unit that is accessible by the computer and the printing device; and a storage control unit that stores in the second storing unit a name indicative of the image data that has been printed.

14. A method for printing comprising:

(a) determining whether image data subject to printing is created in a prescribed image file standard;

(b) referring to additional information attached to the image data;

(c) determining whether the image data is created in a prescribed image data format based on the additional information;

(d) creating printing data based on the image data that is in conformity with the prescribed image file standard and the prescribed image data format;

(e) printing an image based on the printing data created by the creating step (d);

(f) detecting a connection of a storage medium that stores the image data and wherein the determining step (a) performs determination with respect to the image data stored in the storage medium detected by the detecting step (f), wherein when the detecting step (f) detects the connection of the storage medium, and when the determining step (a) determines that the image data is created in conformity with the prescribed image file standard, the determining step (c) performs determination with respect to the image data stored in the storage medium, wherein when the determining step (c) determines that the image data is created in the prescribed image data format, the printing step (e) instructs a printing unit to print the image based on the image data.

15. The method as claimed in claim 14, wherein the additional information includes header information.

16. A method for printing comprising:

(a) determining whether image data subject to printing is created in a prescribed image file standard;

(b) referring to additional information attached to the image data;

(c) determining whether the image data is created in a prescribed image data format based on the additional information;

(d) creating printing data based on the image data that is in conformity with the prescribed image file standard and the prescribed image data format;

(e) printing an image based on the printing data created by the creating;

(f) accessing a storing unit; and wherein when the accessing step (f) stores the image data in the storing unit, the determining step (a) performs determination with respect to the image data stored in the storing unit by the accessing step (f);

wherein when the determining step (a) determines that the image data is created in conformity with the prescribed image file standard, the determining step (c) performs determination with respect to the image data.

* * * * *